(12) United States Patent
Lober et al.

(10) Patent No.: US 7,747,449 B2
(45) Date of Patent: Jun. 29, 2010

(54) METHOD AND COMPUTER SYSTEM FOR PROVIDING A COST ESTIMATE FOR SIZING A COMPUTER SYSTEM

(75) Inventors: Bernd F. Lober, Bad Schönborn (DE); Ulrich Marquard, Bad Schönborn (DE)

(73) Assignee: SAP AG, Walldorf (DE)

( * ) Notice: Subject to any disclaimer, the term of this patent is extended or adjusted under 35 U.S.C. 154(b) by 969 days.

(21) Appl. No.: 10/860,123

(22) Filed: Jun. 4, 2004

(65) Prior Publication Data
US 2005/0027661 A1 Feb. 3, 2005

(30) Foreign Application Priority Data
Jun. 6, 2003 (EP) .................................. 03012947

(51) Int. Cl.
G06Q 10/00 (2006.01)
G06Q 30/00 (2006.01)
G06G 7/00 (2006.01)
G06F 17/00 (2006.01)

(52) U.S. Cl. ........................................ 705/1.1; 705/400
(58) Field of Classification Search .................. 705/1.1, 705/400
See application file for complete search history.

(56) References Cited

U.S. PATENT DOCUMENTS

| 4,890,227 A | 12/1989 | Watanabe et al. |
| 5,668,995 A | 9/1997 | Bhat |
| 5,761,091 A | 6/1998 | Agrawal et al. |
| 5,949,415 A | 9/1999 | Lin et al. |
| 6,003,022 A * | 12/1999 | Eberhard et al. ................ 707/2 |
| 6,260,020 B1 * | 7/2001 | Ruffin et al. .................... 705/1 |

(Continued)

FOREIGN PATENT DOCUMENTS

WO WO 02/097630 A2 12/2002

OTHER PUBLICATIONS

"Quick Sizer Business-Oriented, Proven, Cost Effective Sizing" SAP Solution Brief, 2001 by SAP AG.*

(Continued)

*Primary Examiner*—John W Hayes
*Assistant Examiner*—Allen J Jung
(74) *Attorney, Agent, or Firm*—Finnegan, Henderson, Farabow, Garrett & Dunner, LLP

(57) ABSTRACT

Systems and methods for providing a cost estimate for a data processing system are provided. An exemplary method may include selecting application programs from a set of application programs, wherein each application program may have a number of objects. The method may further include entering data descriptive of a load profile, retrieving a set of sizing coefficients for each object of the selected application programs, and estimating the hardware requirements for each one of the objects of the selected application programs by entering the sizing coefficients and the load profile into a sizing model. The method may further include entering the hardware requirements for each one of the objects of the selected application programs into a cost estimation component to provide a cost estimate for each one of the program objects of the selected application programs. The method may further include calculating a total hardware requirement by adding the hardware requirements, and calculating the total cost estimate for the data processing system by adding the cost estimates for each object of the selected application programs.

14 Claims, 3 Drawing Sheets

U.S. PATENT DOCUMENTS

| | | | |
|---|---|---|---|
| 6,526,504 | B1 | 2/2003 | Veazey et al. |
| 6,542,854 | B2 | 4/2003 | Yang et al. .................. 702/186 |
| 6,542,893 | B1 | 4/2003 | Quernemoen ............... 707/100 |
| 6,654,756 | B1* | 11/2003 | Quernemoen et al. ....... 707/100 |
| 6,904,408 | B1* | 6/2005 | McCarthy et al. ............... 705/2 |
| 6,950,816 | B1* | 9/2005 | Quernemoen et al. .......... 707/2 |
| 6,957,209 | B1* | 10/2005 | Quernemoen .......... 340/310.11 |
| 2001/0044705 | A1 | 11/2001 | Vardi et al. |
| 2002/0178206 | A1 | 11/2002 | Smith |
| 2003/0095793 | A1* | 5/2003 | Strothmann et al. ........... 386/95 |
| 2003/0188155 | A1* | 10/2003 | Petit ........................... 713/155 |
| 2005/0171858 | A1* | 8/2005 | Cotton et al. ................. 705/26 |

OTHER PUBLICATIONS

"Quick Sizer (Business-Oriented, Proven, Cost Effective Sizing,)," SAP Solution Brief, Apr. 1, 2014, 2 pages.

"Optimizer Model for SAP (Performance Analysis and Infrastructure Sizing for SAP Environments)," Hy-Performix, Inc., 2003, 6 pages.

Missbach, M. and Hoffmann, U. "SAP Hardware Solutions Servers, Storage and Networks for mySAP.com," ISBN 0-13-028084-4 (2001), 81-117.

Communication Pursuant to Article 94(3) EPC in EPO Application No. 03 012 947.2-2224, dated Dec. 10, 2008, six (6) pages total.

* cited by examiner

METHOD AND COMPUTER SYSTEM FOR PROVIDING A COST ESTIMATE FOR SIZING A COMPUTER SYSTEM

TECHNICAL FIELD

The present invention relates to the field of estimating the cost for a data processing system, and more particularly to sizing of a data processing system.

BACKGROUND

Various sizing methodologies for predicting the hardware investment needed to run software applications are known from the prior art. "Sizing" encompasses the determination of the central processing unit (CPU) requirements, volatile memory requirements (e.g., cache memory or random access memory), and mass storage requirements (e.g., hard disk capability) of a data processing system that is capable of running a given software application at acceptable performance levels.

U.S. Pat. No. 6,542,854 shows a method and mechanism for sizing a hardware system for a software workload. The workload is modelled into a set of generic system activities which are not directly tied to a specific hardware platform. Suitable hardware systems or components are selected by analyzing the workload and hardware profiles in terms of the generic system activities.

U.S. Pat. No. 6,542,893 shows a database sizer. The database sizer calculates the total mass storage requirements for a relational database table including database storage requirements, application and software requirements, system table requirements, scratch and sort requirements, log file requirements, and growth requirements. The database sizing is done by providing detailed inputs for tables in the database sufficient to calculate the required table size for each table; providing detailed inputs for each index for each table in the database sufficient to calculate the required index size for each table; providing input parameters for each database system, including the page size, the fill factor, the log file space, the temporary space (as a percent of the formatted database size including indexes), the space required for operating system and application software, the space required for system databases, the percent growth required for the database, and the page file space; calculating a total storage requirement for the database using the inputs and input parameters; and calculating a storage requirement for the data base management system using the inputs and input parameters. The calculated storage requirements include separately output operating system and application software space requirements, system table space requirements, scratch and sort space requirements, and log file space requirements.

Quick Sizer is a SAP® program product which assists in selecting the hardware and system platform that meets specific business requirements. Quick Sizer provides online, up-to-date sizing based on business-oriented figures, such as the number of users or expected number of business processes and documents (http://www.sap.com/andeancarib/soluciones/technology/documentacion/Ouick%20Sizer.pdf).

The Optimizer Model for SAP is an option to the HyPerformix Integrated Performance Suite™ (IPS). (http://www-.hyperformix.com/whitepapers/Optimizer%20Model%20for%20SAP.pdf). The Optimizer Model for SAP includes models for the major SAP R/3 software modules (e.g., Financials, Sales and Distribution) and combines them with the extensive hardware library found with the HyPerformix Infrastructure Optimizer™ (Optimizer) product. Optimizer enables its users to analyze and optimize end-to-end performance of their SAP application on various hardware configurations.

The Optimizer Model for SAP takes workload and configuration parameter inputs. Workload parameters include the number of users of each SAP R/3 module. Configuration parameters include the number of servers at each tier (e.g., web, application) and the number of processes (e.g., Dialogue workers) on each server. Once workload and configuration parameters are specified, an application model is generated and automatically added to a hardware topology model created using Optimizer. "What-if" experiments can then be carried out to evaluate various performance questions.

The Optimizer Model for SAP provides a default set of resource usage metrics for each of the SAP modules. These metrics are similar to those used in SAP Quick Sizer and include both CPU and network usage metrics. Early in the design phase, architects can quickly build models using the default resource metrics to do first-cut sizing performance analysis. Later, models can be calibrated with actual measurements collected during functional testing. Scenarios can then be rerun to ensure the application is still on target to meet its performance goals. At least one problem with the above discussed systems is that they do not provide for cost contributions based on a per object and/or a per transaction basis. Accordingly there is a need for better systems and methods for providing a cost estimate for a data processing system.

SUMMARY

One embodiment consistent with the present invention provides for a method of providing a cost estimate for a data processing system by determining the hardware requirements for each object of a selected application program and estimating of the corresponding cost. The object specific hardware requirements and cost are added up in order to provide the total hardware requirements and the total cost estimate. The total of the cost can be broken down into the cost contributions of individual objects.

Exemplary embodiments consistent with the present invention enable a user to make a plausibility test whether a projected data processing system makes sense from an information technology (IT) cost perspective. For example, if the estimated initial IT cost per transaction surpasses the economic value of a typical transaction to be processed by the data processing system, this indicates that the architecture of the data processing system requires an adaptation in order to reduce the data processing cost. This can be done by reducing the level of granularity by which transactions are to be processed in the data processing system. For example, instead of tracking each individual item of a bill of material it can be sufficient to keep track of lots of a class of the item which reduces the data processing and storage requirements.

In accordance with one embodiment of the invention, the user may have to select application programs from a set of application programs which are supported by the computer system for making the cost estimate. Each one of the application programs may have a predetermined number of objects, which are also referred to as 'business objects.' Business objects may be the data processing entities which in combination constitute a transaction, such as the processing of an order. For example the processing of an order includes the business objects 'acceptance of order,' and 'invoice.'

Further a user may enter a load profile as a basis for the sizing. In one embodiment, the load profile may include only the expected dynamic load profile of the data processing system rather than the static load profile. This is advantageous in order to limit the effort required for the sizing and to provide a lower limit of the cost estimate. A lower limit for the cost estimate in most cases may be sufficient in order to perform a plausibility check whether a project data processing system is acceptable or requires modification from a cost perspective. For example, if the lower limit for a cost estimate per transaction surpasses the economic value of the transaction, such as the value of the ordered item, this means that the plausibility check has failed and that the projected data processing system requires modifications.

In accordance with another embodiment of the invention, the sizing of the data processing system is done step by step for the business objects of the selected application program. For this purpose, sizing coefficients for each business object may be retrieved from a database table. The sizing coefficients may be entered into a sizing model which provides the estimated hardware requirements for the implementation of that individual business object.

These business object specific hardware requirements may be used for estimating the implementation cost for that individual business object. After this has been done for the business objects of the selected application program, the business object specific hardware requirements and the business object specific costs may be added up, respectively. For example, this provides an estimate of a lower limit for the implementation costs and/or the implementation costs per year and/or the implementation costs per transaction.

In accordance with yet another embodiment of the invention, the sizing model may be a linear sizing model using a set of linear equations. The linear equations may be parameterized by means of the sizing coefficients to provide the hardware requirements per business object.

In accordance with still another embodiment of the invention several load ranges may be defined for the sizing. Within each load range the sizing may be done linearly. This can be done by assigning different sets of sizing coefficients to different load ranges.

In accordance with another embodiment of the invention, the cost estimation may be done based on a linear cost model. For example the linear cost model may include a cost factor of cost per CPU requirement, cost per memory requirement and cost per mass storage requirement. These factors may be multiplied by the projected hardware requirements of the data processing system to provide the cost estimates.

It is an advantage of at least some embodiments of the present invention that it supports a yes/no decision for an IT investment on the basis of a cost estimate.

It is another advantage of at least some embodiments of the present invention that the cost contributions of the individual objects are provided which helps a user to identify more efficient and cost effective options for the configuration of the projected data processing system.

It is another advantage of at least some embodiments of the present invention that the cost estimation, and in particular the cost estimation per transaction, can be used as a so-called key performance indicator (KPI). This KPI definition enables a customer to perform a plausibility check whether an investment in a projected data processing system is reasonable and guarantees a possible appropriate return on investment (ROI), or if the projected data processing system requires modifications in order to align the structure of the data processing system with the business environment of the customer.

BRIEF DESCRIPTION OF THE DRAWINGS

It is to be understood that both the foregoing general description and the following detailed description are exemplary and explanatory only and are not restrictive of the invention, as claimed. The accompanying drawings, which are incorporated in and constitute a part of this specification, illustrate several embodiments of the invention and together with the description, serve to explain the principles of the invention. In the drawings:

DESCRIPTION OF THE EMBODIMENTS

Figure 1:
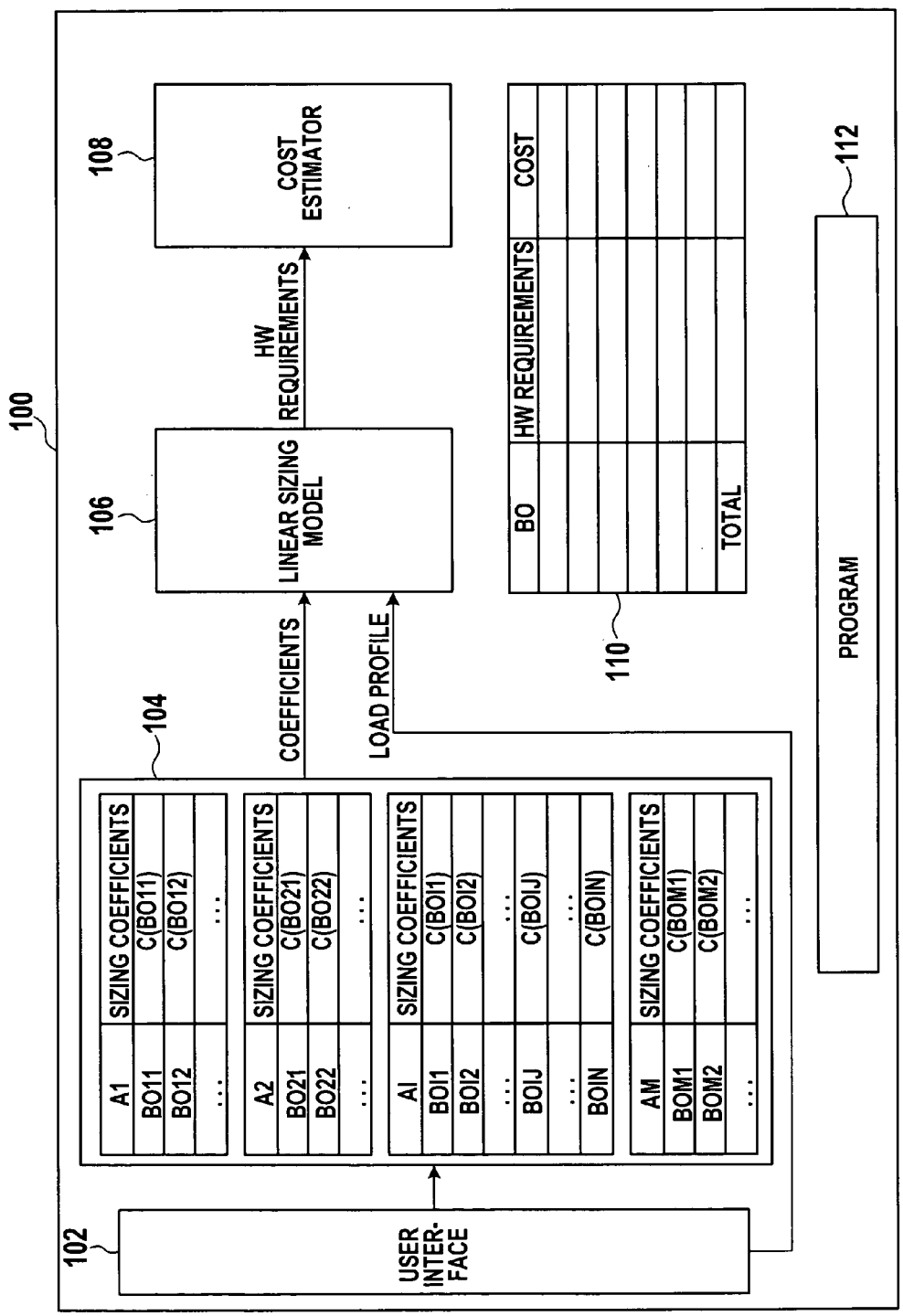
FIG. 1 is a block diagram of a first embodiment of a computer system, consistent with the invention.

FIG. 1 shows a computer system 100 having a user interface 102 and a coefficient database 104.

Computer system 100 may support a number of application programs A1, A2, . . . , AI, . . . AM. Each one of these application programs may have a number of business objects. For example, application program Al has business objects BO11, BO12, . . . ; application program A2 has business objects BO21, BO22, . . . ; and application program Al has business objects BOi1, BOi2, . . . BOij, . . . BOin.

Coefficient database 104 may store the sizing coefficients for each one of these business objects. For example the business object BO11 of application program A1 has an assigned set of sizing coefficients C(BO11) and business object BO12 has set C(BO12).

Further computer system 100 may have a linear sizing model 106. Linear sizing model 106 may provide an estimate for the hardware requirements to implement an arbitrary business object BOij. Linear sizing model 106 may be parameterized by the set C(BOij) of business object BOij and may evaluate a load profile which is entered via user interface 102 by means of a set of linear equations.

A cost estimator 108 may be coupled to linear sizing model 106. On the basis of the hardware requirements per business object delivered by linear sizing model 106, cost estimator 108 may calculate a cost estimation for the implementation of that business object.

The hardware requirements per business object and the cost estimation per business object may be stored in a result database 110. After the processing for providing a cost estimate for a selected one of the application programs AI has been completed, result database 110 contains an entry for each one the business objects BOij of the application program and its related hardware requirements and cost estimates. On the basis the total of the hardware requirements and the total of the cost is calculated. For example results database 110 can be realised by means of a spreadsheet.

The overall system control and the flow of information within computer 100 may be controlled by a program 112.

In an example, the load profile data which a user may enter via user interface 102 may include the following data:

total number of transactions, such as orders, to be processed per year (N), average number of items per transaction (I), average number of concurrent users (U), average retention time of business objects being related to a transaction before archiving (T).

On the basis of these load profile data, linear sizing model 106 can calculate an estimate for the hardware requirements by means of the following equations:

$$CPU\ (BOij) = N * I * c1$$

$$Memory\ (BOij) = N * I * U * c2$$

$$Disk\ space\ (BOij) = N * I * T * c3 * c4,$$

where CPU (BOij) is the central processing unit requirement for a business object BOij, Memory (BOij) is the volatile memory requirement for business object BOij and Disk space (BOij) is the mass storage requirement for business object BOij. The coefficients c1, c2, c3, and c4 constitute the set of coefficients C(BOij).

In operation, a user may select one of the application programs Ai and enter the projected load profile via user interface 102. In response, the sizing coefficients for the business objects of the selected application program may be retrieved from coefficient database 104 and entered into linear sizing model 106 as well as the load profile data.

On this basis, linear sizing model 106 may calculate an estimate of the hardware requirements for each one of the business objects of the selected application program. For example, linear sizing model 106 may output a set of three hardware parameters for each business object in order to indicate the hardware requirements in terms of CPU, memory and disk space requirements. The estimation of the business object specific hardware requirements provided by linear sizing model 106 may be stored in result database 110.

The estimated hardware requirements determined by linear sizing model 106 may be entered into cost estimator 108. Cost estimator 108 may calculate the cost estimate for each one of the business objects on the basis of the set of hardware parameters delivered by linear sizing model 106 per business object. For example, this can be done by calculating $$Cost\ (Boij) = CPU\ (Boij) * a + Memory\ (Boij) * b + Disk\ space\ (Boij) * c,$$

where a is a monetary amount (e.g., Euro amount) per CPU requirement, e.g., measured using the Sap Application Performance Standard(SAPS), b is a monetary amount (e.g., Euro amount) per memory volume and c is a monetary amount (e.g., Euro amount) per disk space volume.

The SAP Application Performance Standard (SAPS) is a hardware-independent unit that describes the performance of a system configuration in the SAP environment. It is derived from the SD Standard Application benchmark, where 100 SAPS are defined as 2,000 fully business processed order line items per hour. In technical terms, this throughput is achieved by processing 6,000 dialog steps (screen changes), 2,000 postings per hour in the SD benchmark, or 2,400 SAP transactions. Fully business processed in the SD Standard Application Benchmark means the full business process.

The resulting estimated cost per business object Cost (BOij) may be stored in database table 110. When all business objects of the selected application program have been processed, the business object specific hardware requirements and the business object specific cost estimates can be added up to provide the total hardware requirements and the total cost estimate.

By way of a non-limiting example, the sizing coefficients and the coefficients a, b, and c of cost estimator 108 are selected such that the resulting cost estimates provide a lower limit for the actual cost in order to enable a plausibility check. Results database 110 can be visualised via user interface 102, e.g., in the form of a spreadsheet.

Figure 2:
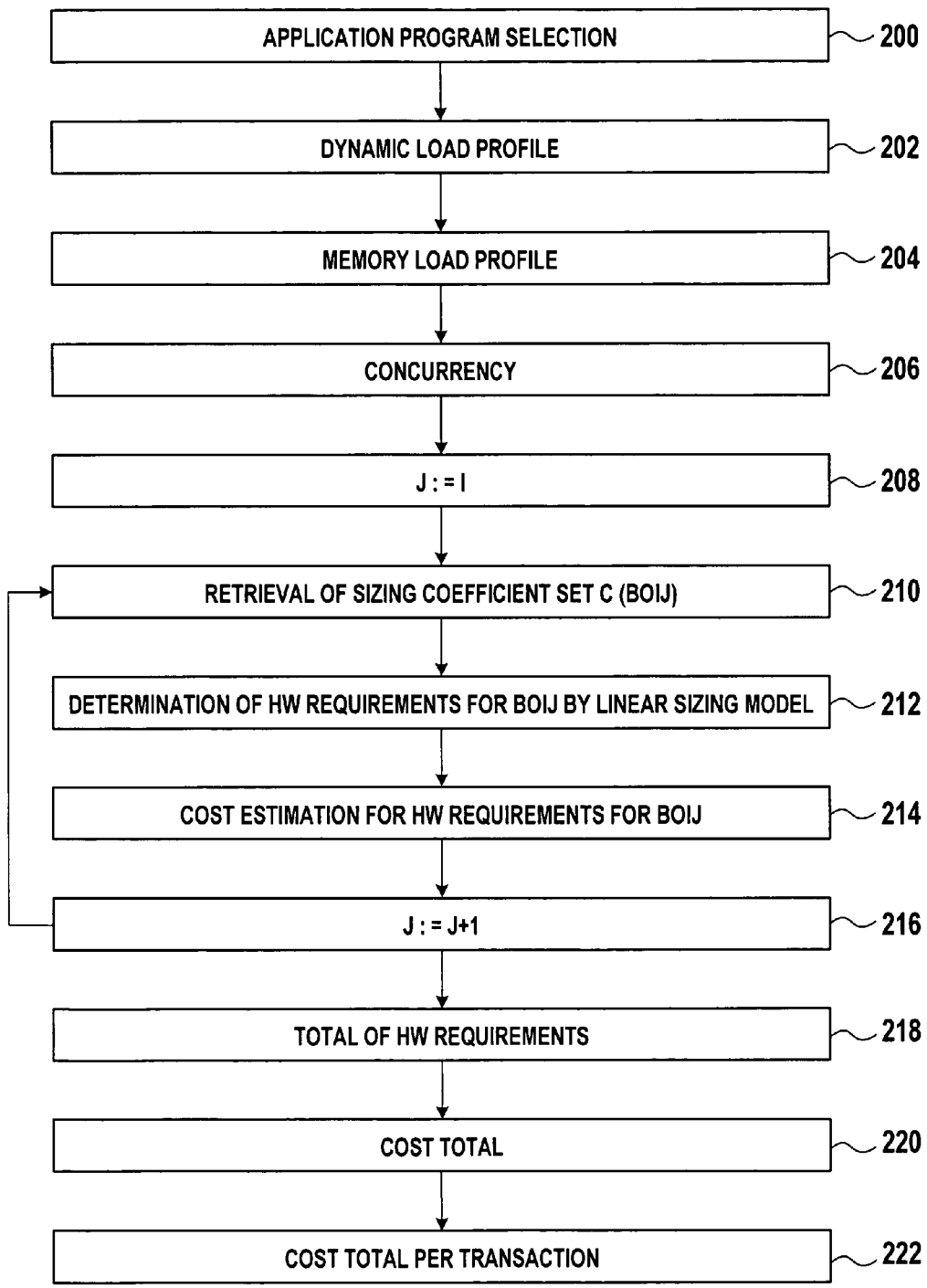
FIG. 2 is illustrative of a flow chart for performing sizing and cost estimation, consistent with the invention.

FIG. 2 is illustrative of a flow chart of a method for performing sizing and cost estimation. The method may be performed using computer system 100. In step 200, a user may enter a selection of one of the application programs supported by the system. In step 202, the user may enter a dynamic load profile in order to describe the projected dynamic load of the selected application program running on the planned data processing system. The dynamic load profile can be entered in terms of the total number of transaction or the total number of transactions per time unit. In addition the average number of items can be entered to specify the dynamic load profile.

In step 204, the user may enter a memory load profile. This can be done by entering an average retention time of business objects related to a transaction before archiving. In step 206, the user may input data which are descriptive of the projected concurrency, i.e., the expected average number of concurrent users.

In step 208, the index j may be initialized. In step 210, the sizing coefficients of the business object BOi1 of the selected application program Ai may be retrieved from the coefficient database. In step 212, the coefficient set retrieved in step 210 as well as the dynamic load profile, memory load profile, and concurrency data may be entered into the linear sizing model in order to estimate the business object specific hardware requirements. On this basis, a cost estimation for the business object specific costs may be performed in step 214. In step 216, the index j may be incremented and the control may go back to step 210 in order to perform the steps 210 to 214 for the next business object BOi2. Steps 210 to 216 may be repeated until all business objects up to business object BOin of the selected application program Ai have been processed.

Next, the total hardware requirements may be calculated in step 218 by adding up of the business object specific hardware requirements. Likewise, the estimated total cost may be calculated in step 220 by adding up of the business object specific cost estimates. In addition, the estimated total cost per transaction may be provided in step 222 by dividing of the total cost by the expected total number of transaction per timed unit. This number can be used as a key performance indicator to evaluate the cost effectiveness of the projected data processing system.

Figure 3:
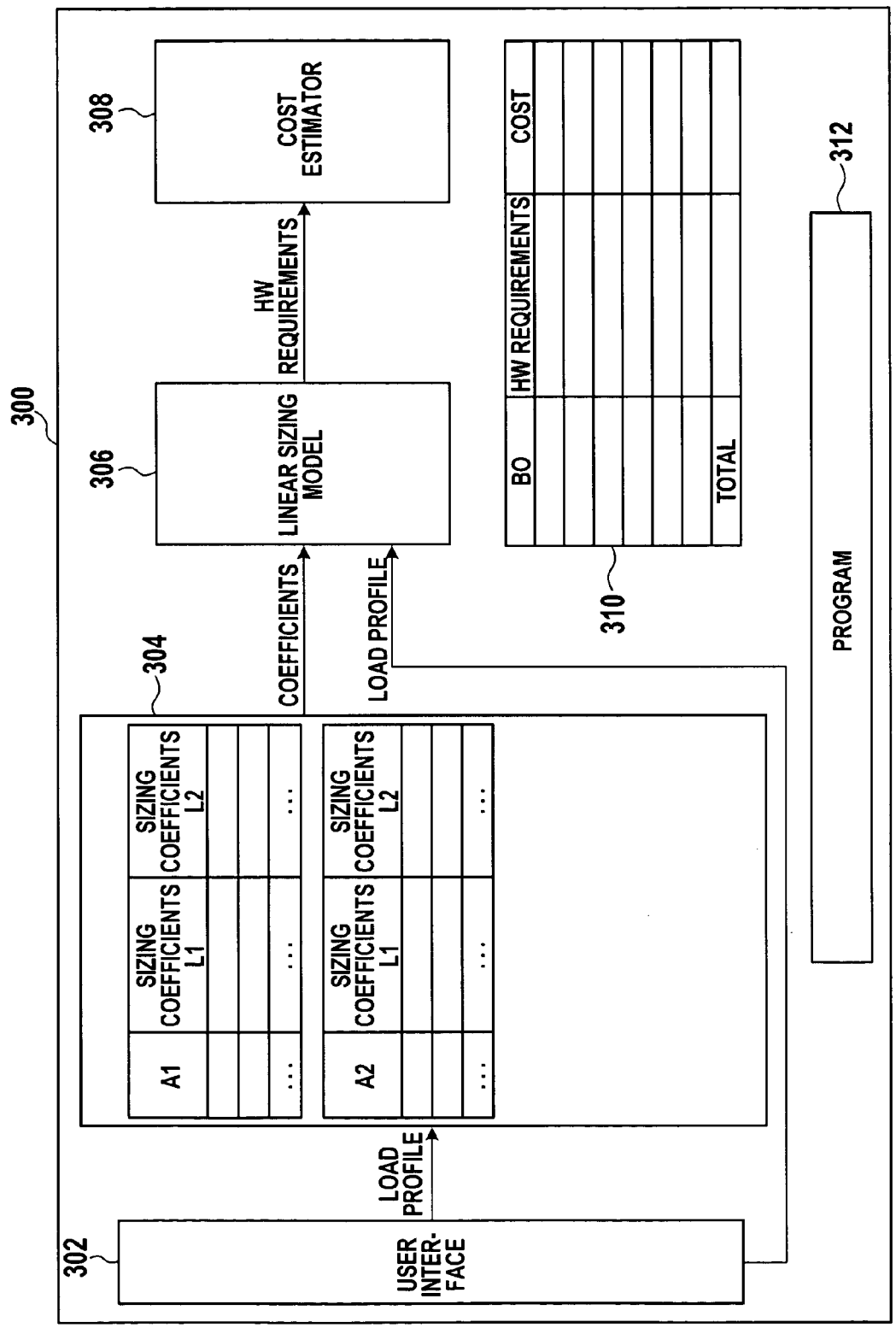
FIG. 3 is illustrative of an alternative embodiment of a computer system consistent with the invention.

FIG. 3 shows a block diagram of another embodiment in the form of a computer system 300. Like elements of the embodiments of FIGS. 1 and 3 are designated by like reference numerals, increased by a value of 200 to designate elements of the embodiment in FIG. 3.

In the embodiment of FIG. 3, computer system 300 may have a coefficient database 304, which may contain at least two sets of sizing coefficients for each business object BOij. Each one of the sets of sizing coefficients may be assigned to a specific load range L1 or L2. This enables splitting up of the sizing task into linearized ranges rather than a single range, for greater precision.

In operation, the load profile entered via a user interface 302 may be used to select one of the sets of sizing coefficients which are assigned to each one of the business objects BOij (not shown in FIG. 3). This may be done by determining whether the load profile which has been entered via user interface 302 is within load range L1 or load range L2. If the load profile is within load range L2, this means that the set of sizing coefficients which is assigned to that load range L2 is selected. Otherwise, the set of sizing coefficients assigned to the other load range is selected. The selected sets of sizing coefficients may be entered into linear sizing model 306, in a manner analogous to the embodiment of FIG. 1.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of providing a cost estimate for a data processing system, the method comprising:
   selecting, by a central processing unit, application programs, from a set of application programs, each application program having objects;
   entering, by a central processing unit, load profile data for the selected application programs,
   wherein the load profile data comprises a total number of orders to be processed per year by means of the selected application programs on the data processing system, an average number of items per order, an average number of concurrent users, and an average retention time of an object before archiving;
   retrieving, from a database, sets of sizing coefficients for the objects of the selected application programs, the number of retrieved sets of sizing coefficients for the objects of the selected application program corresponding to the number of selected application programs, and the retrieved sets of sizing coefficients being unique and assigned to a particular selected application program among the selected application programs;
   estimating, by the central processing unit, hardware requirements for the data processing system for the objects of the selected application programs by entering the sizing coefficients and the load profile data into a sizing model;
   entering the hardware requirements for the objects of the selected application programs into a cost estimation component to generate cost estimates for the objects of the selected application programs;
   calculating, by the general processing unit, the total hardware requirement by adding the hardware requirements for the objects of the selected application programs;
   calculating, by the central processing unit, a total cost estimate for the data processing system by adding the cost estimates for the objects of the selected application programs; and
   outputting the total cost estimate.

2. The method of claim 1, wherein the sizing model comprises a linear sizing model.

3. The method of claim 1, wherein the objects of the selected application programs have at least a first and a second set of sizing coefficients, the sets of sizing coefficients are assigned to a load range and, the method further comprises selecting one of the at least the first and the second set of sizing coefficients on the basis of the load profile data.

4. The method of claim 1, wherein the cost estimation component is based on a linear cost model.

5. The method of claim 1, wherein the hardware requirements further comprise business requirements and the objects of the selected application programs further comprise business objects.

6. A computer system memory device storing computer instructions, which when executed by a computer central processing unit cause the central processing unit to execute a method for providing a cost estimate for a data processing system, the method comprising:
   receiving a selection of application programs from a set of application programs, each application program having objects;
   receiving a load profile for the selected application programs,
   wherein the load profile data comprises a total number of orders to be processed per year by means of the selected application programs on the data processing system, an average number of items per order, an average number of concurrent users, and an average retention time of an object before archiving;
   retrieving, from a database, sets of sizing coefficients for the objects of the selected application programs, the number of retrieved sets of sizing coefficients for the objects of the selected application program corresponding to the number of selected application programs, and the retrieved sets of sizing coefficients being unique and assigned to a particular selected application program among the selected application programs;
   calculating an estimate of hardware requirements for the data processing system for the objects of the selected application programs by processing the sizing coefficients and the load profile data in a sizing model program component;
   calculating an estimate for cost for the implementation for the objects of the selected application programs by processing the hardware requirements in a cost estimation program component;
   calculating the total hardware requirement by adding the hardware requirements for the objects of the selected application programs;
   calculating the total cost estimate for the data processing system by adding the cost estimates for the objects of the selected application programs; and
   outputting the total cost estimate.

7. The computer system memory device of claim 6, wherein the sizing model program component comprises a linear sizing model.

8. The computer system memory device of claim 6, wherein the objects of the selected application programs have at least a first and a second set of sizing coefficients, wherein the sets of sizing coefficients are assigned to a load range, and wherein the program means selects one of the at least the first and the second set of sizing coefficients based on the load profile data.

9. The computer system memory device of claim 6, wherein the cost estimation program component is based on a linear cost model.

10. A computer system for providing a cost estimate for a data processing system comprising:
    a user interface for selecting application programs from a set of application programs, the application programs having objects, and for entering load profile data for the selected application programs,
    wherein the load profile data comprises a total number of orders to be processed per year by means of the selected application programs on the data processing system, an average number of items per order, an average number of concurrent users, and an average retention time of an object before archiving;
    a central processing unit retrieving, from a database, sets of sizing coefficients for the objects of the selected application programs, the number of retrieved sets of sizing coefficients for the objects of the selected application program corresponding to the number of selected application programs, and the retrieved sets of sizing coefficients being unique and assigned to a particular selected application program among the selected application programs;
    a sizing model for estimating the hardware requirements for the data processing system for the objects of the selected application programs, the sizing model being adapted to provide the estimation of the hardware requirements by processing of the sizing coefficients and the load profile data;

a cost estimator for providing cost estimates for the objects on the basis of the estimated hardware requirements; and the central processing unit calculating the total hardware requirement on the basis of the hardware requirements for the objects, calculating the total cost estimate of the data processing system on the basis of the cost estimates for the objects, and outputting the total cost estimate.

11. computer system of claim 10, wherein the sizing model comprises a linear sizing model.

12. The computer system of claim 10, further comprising a memory storing of at least a first and a second set of sizing coefficients for each object of the application programs, each of the sets of sizing coefficients being assigned to a load range, and wherein the central processing unit retrieving a set of sizing coefficients is adapted to select one of the at least the first and the second set of sizing coefficients based on the load profile.

13. The computer system of claim 10, wherein the cost estimator is based on a linear cost model.

14. A method of providing a cost estimate for a data processing system, the method comprising:

selecting application programs from a set of application programs using a central processing unit, each application program having objects;

entering load profile data for the selected application programs, wherein the load profile data comprises a total number of orders to be processed per year by the selected application programs on the data processing system, an average number of items per order, an average number of concurrent users, and an average retention time of an object before archiving;

retrieving, from a database, sets of sizing coefficients for the objects of the selected application programs;

estimating, by the central processing unit, hardware requirements for the data processing system for the objects of the selected application programs by entering the sizing coefficients and the load profile data into a sizing model;

entering the hardware requirements for the objects of the selected application programs into a cost estimation component to generate cost estimates for the objects of the selected application programs;

calculating, by the central processing unit, the total hardware requirement by adding the hardware requirements for the objects of the selected application programs;

calculating a total cost estimate for the data processing system by adding the cost estimates for the objects of the selected application programs; and outputting the total cost estimate.

* * * * *